United States Patent
Kakinuma et al.

[11] Patent Number: 5,840,465
[45] Date of Patent: Nov. 24, 1998

[54] COMPOSITIONS AND METHOD FOR FORMATION OF BARRIER RIBS OF PLASMA DISPLAY PANEL

[75] Inventors: Masahisa Kakinuma, Menuma-machi; Osamu Kawana; Katsuto Murata, both of Sakado, all of Japan

[73] Assignee: Taiyo Ink Manufacturing Co., Ltd., Japan

[21] Appl. No.: 543,217

[22] Filed: Oct. 13, 1995

[51] Int. Cl.$^6$ .............. H01J 9/02; H01J 11/00; C03B 19/06

[52] U.S. Cl. ............ 430/270.1; 430/320; 65/17.3; 65/17.5

[58] Field of Search ............... 445/24; 65/17.3, 65/17.5, 17.6, 17.2; 430/320, 270.1

[56] References Cited

U.S. PATENT DOCUMENTS

| | | | |
|---|---|---|---|
| 5,209,688 | 5/1993 | Nishigaki et al. | 445/24 |
| 5,240,488 | 8/1993 | Chandross et al. | 65/3.11 |
| 5,464,724 | 11/1995 | Akiyama et al. | 430/272.1 |

FOREIGN PATENT DOCUMENTS

| | | |
|---|---|---|
| 62-155541 | 7/1987 | Japan. |
| 1-119528 | 5/1989 | Japan ................ 65/17.2 |
| 4-123339 | 9/1989 | Japan. |
| 3-20926 | 1/1991 | Japan ................ 445/24 |
| 4-109536 | 4/1992 | Japan. |
| 4-236266 | 8/1992 | Japan. |
| 5-234514 | 9/1993 | Japan. |

Primary Examiner—Martin Angebranndt
Attorney, Agent, or Firm—Rader, Fishman & Grauer

[57] ABSTRACT

A composition for the formation of barrier ribs of a plasma display panel and a method for the formation of the barrier ribs are disclosed. The formation of barrier ribs is effected by applying either a composition comprising (A) a low-melting glass having a working point of not more than 560° C., (B) a hydroxyl group-containing polymer having at least two hydroxyl groups per molecule, (C) an inorganic filler, (D) a diluent, and (E) an organosilicic compound possessing in one terminal part thereof an alkoxysilane group having at least two alkoxy groups bonded thereto and in the other terminal part thereof an amine terminal group or a composition comprising (F) a blocked isocyanate compound having isocyanate groups blocked with an amine in addition to the components (A) through (E) mentioned above to a photosensitive film on a substrate so as to fill up grooves formed in the photosensitive film in a prescribed pattern, drying the composition, thermally curing the composition, separating the photosensitive film from the substrate by means of a remover, and subsequently calcining the hardened composition.

33 Claims, 4 Drawing Sheets

COMPOSITIONS AND METHOD FOR FORMATION OF BARRIER RIBS OF PLASMA DISPLAY PANEL

BACKGROUND OF THE INVENTION

1. Field of the Invention

This invention relates to compositions to be used for the formation of barrier ribs of a plasma display panel (hereinafter referred to briefly as "PDP") for use in image displays such as for wall television sets or in information displays such as for computer terminal devices, ticket vending machines, vehicles, hotels, and banks and a method for the formation of barrier ribs by the use thereof.

2. Description of the Prior Art

The PDP is a planar display for displaying images and information by virtue of the emission of light by gas discharge. By the construction of panel and the method of operation, it is known in two types, i.e. DC (direct current) type and AC (alternating current) type. By way of example, the principle of the DC type color PDP will be briefly explained below with reference to FIG. 1. In the DC type color PDP, the space intervening between two transparent substrates 1a and 1b (generally glass plates) is divided into numerous minute cells by latticed barrier ribs 2 interposed between the transparent substrates. The individual cells have such a discharge gas as He or Xe sealed therein. The reference numerals 3a through 3c denote fluorescent membranes which, on being excited by the ultraviolet light generated by the discharge of the discharge gas, emits visible light of three primary colors. On the inner faces of the two substrates, electrodes 4a and 4b are disposed as opposed to each other across the relevant cells. Generally, the cathodes 4a are formed of a film of transparent electroconductive material such as NESA glass. When a high voltage is applied between these electrodes 4a and 4b, the discharge gas which is sealed in the cells induces plasma discharge P and, by virtue of the ultraviolet light radiated consequently, incites the fluorescent elements of red (3a), blue (3b), and green (3c) colors to emit lights and effect the display of an image. In the full-color display system, three fluorescent elements severally of the three primary colors of red, blue, and green mentioned above jointly form one picture element.

The cells in the DC type PDP are divided by the component barrier ribs of a lattice, whereas those in the AC type PDP are divided by the barrier ribs which are parallelly arranged on the faces of substrates. In either case, the cells are divided by barrier ribs. These barrier ribs are intended to confine the luminous discharge within a fixed area so as to preclude false discharge or cross talk between adjacent discharge cells and ensure ideal display. They are endowed with the function of retaining uniform discharge spaces owing to their own height, width, and pattern gap and enhancing the mechanical strength of the whole panel. In order for the PDP to acquire high luminance, it is necessary that the discharge gas spaces be as wide as permissible and the barrier ribs be as thin as possible. Specifically, it is necessary to form barrier ribs which have a large aspect ratio (ratio of height to width), a narrow width, a great height, and fully sufficient strength.

As means to form barrier ribs in the PDP, various methods such as a method resorting to screen printing and a method relying on the use of a photosensitive film (dry film) have been heretofore known. The screen printing, however, incurs difficulty in registering the discharge electrodes formed in advance on the faces of transparent substrates and the places selected for printing paste and particularly in ensuring this registration throughout the entire face of the panel in spite of possible elongation of the printing screen. As a result, it entails the problem that owing to frequent repetition of the register printing, the barrier ribs acquire disfigured skirts and inaccurate heights and the display cells suffer their shapes to be heavily affected by smears possibly adhering to the barrier ribs and produce displays of inferior quality. Besides, the screen printing has the disadvantage of affording only poor workability as well. Thus, the feasibility of a method which effects the formation of PDP barrier ribs by the use of a photosensitive film has been under study recently.

The method which uses a photosensitive film for the formation of barrier ribs comprises first covering discharge electrodes disposed on the face of a transparent substrate with the photosensitive film and superposing on the photosensitive film a photomask having prescribed pattern holes formed therein at the positions opposite the discharge electrodes, then subjecting the photosensitive film to exposure to light and development to remove the areas of the photosensitive film which has not been exposed to light through the photomask, subsequently applying glass paste to the photosensitive film so as to fill the grooves formed in the pattern in consequence of the exposure to light and development mentioned above, drying and hardening the glass paste in the grooves, and thereafter removing the photosensitive film and calcining the glass paste and cleansing the calcined glass paste. For the removal of the photosensitive film, a method which attains the removal by means of peeling with a chemical agent (stripping agent or remover) and a method which effects burning-off of the film at the same time that the glass paste is calcined are available.

The method which uses the remover for removing the photosensitive film as mentioned above comprises immersing the film in the remover thereby swelling the film with the agent and then separating the swelled film from the substrate. The film, on being swelled, not only bulges upwardly but also expands laterally. This lateral expansion of the film exerts pressure on the barrier ribs manufactured from the glass paste possibly to the extent of flattening part of the barrier ribs or suffering such barrier ribs to be peeled off at the same time that the film is removed by peeling and, consequently, entails the problem that part or the whole of barrier ribs peel off. Because of the problem, the method which attains the removal of the photosensitive film from the substrate by means of a remover has not yet found acceptance for practical use. A method which effects the removal of the photosensitive film by means of combustion at the time that the glass paste is calcined as disclosed in published Japanese Patent Application, KOKAI No. (hereinafter referred to briefly as "JP-A-") 04-109,536 is generally adopted. This method, however, has the problem that cinders (residue) 6 of the photosensitive film remain between adjacent barrier ribs 2 as shown in FIG. 2 and leave black smears behind in an image. This defect forms a factor for seriously degrading the quality of the PDP.

On account of the problems mentioned above, the development of a method which uses a remover as means to remove the photosensitive film has been longed for recently. The conventional composition of glass paste for barrier ribs contains glass, a filler, and a binder as main components thereof and, as the binder, uses such a thermoplastic resin as nitrocellulose which is burned off at the time of calcining of the paste and possibly avoids possessing a reactive functional group. The barrier ribs which are formed of this composition, therefore, are readily swelled with a remover and peeled off at the same time that the photosensitive film is separated and are at a disadvantage in encountering difficulty in acquiring fully satisfactory strength.

Thus, there has been no alternative but to adopt the method which accomplishes the removal of the photosensitive film by combustion at the same time that the glass paste is calcined. In addition to the problem posed as described above by the cinders of the photosensitive film, this method has the disadvantage that part of the barrier ribs sustain cracks 5 and consequently suffer from deformation and disintegration and, as a result, part of the glass paste 2a remains in the display cells and leaves smears behind therein as shown in FIG. 2. This method, therefore, incurs difficulty in forming uniform and stable barrier ribs having a fixed aspect ratio.

JP-A-05-234,514 discloses a method which allows barrier ribs to be produced with enhanced strength by applying glass paste to the upper faces of barrier ribs either during or at the end of the process of forming barrier ribs and calcining the applied layer of the glass paste on the barrier ribs. Even this method adopts the method of implementing the removal of the photosensitive film by combustion at the same time that the glass paste is calcined. No solution whatever has ever been found concerning the method which uses a remover and which, therefore, entails the problem that the barrier ribs are peeled off at the same time that the photosensitive film is peeled.

SUMMARY OF THE INVENTION

The present invention, made in light of the problems attendant on the prior art as described above, has for a main object thereof the provision of a composition for the formation of barrier ribs which, during the separation of a photosensitive film from a substrate by means of a remover in the process of forming the PDP barrier ribs, permits smooth separation of the photosensitive film without entailing peeling of hardened barrier ribs and, during the subsequent course of calcining of the composition, avoids compelling the barrier ribs to sustain cracks or chippings or suffering the burnt photosensitive film to leave cinders behind, and consequently permits formation of barrier ribs having a fully satisfactory aspect ratio and enjoying high accuracy and high strength.

Another object of the present invention is to provide a method for the formation of the PDP barrier ribs, which method permits the barrier ribs of such high accuracy and high strength as mentioned above to be formed with fully satisfactory workability.

To accomplish the objects mentioned above, one aspect of the present invention provides a composition for the formation of the PDP barrier ribs, which comprises (A) a low-melting glass having a working point (working temperature) of not more than 560° C. , (B) a hydroxyl group-containing polymer having at least two hydroxyl groups per molecule, (C) an inorganic filler, (D) a diluent, and (E) an organosilicic compound possessing in one terminal part thereof an alkoxysilane group having at least two alkoxy groups bonded thereto and in the other terminal part thereof an amine terminal group.

A second aspect of the present invention provides a composition for the formation of the PDP barrier ribs, which comprises (A) a low-melting glass having a working point of not more than 560° C. , (B) a hydroxyl group-containing polymer having at least two hydroxyl groups per molecule, (C) an inorganic filler, (D) a diluent, (E) an organosilicic compound possessing in one terminal part thereof an alkoxysilane group having at least two alkoxy groups bonded thereto and in the other terminal part thereof an amine terminal group, and (F) a blocked isocyanate compound having isocyanate groups blocked with an amine.

Another aspect of the present invention provides a composition for the formation of the PDP barrier ribs, which comprises (G) a modified silicone oil having at least four alkoxysilane groups or silanol groups per molecule in addition to the components of the composition according to the first or second aspect of the present invention mentioned above.

A further aspect of the present invention is to provide a method for the formation of the PDP barrier ribs, which comprises the steps of coating the surface of a transparent substrate with a photosensitive film, forming grooves of a prescribed pattern in the photosensitive film by a photo-process or photoengraving process, applying the aforementioned composition for the formation of barrier ribs to the photosensitive film so as to fill up the grooves, drying the composition, thermally curing the composition, separating the photosensitive film from the substrate by means of a remover, and thereafter calcining the resultant hardened composition to form barrier ribs.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
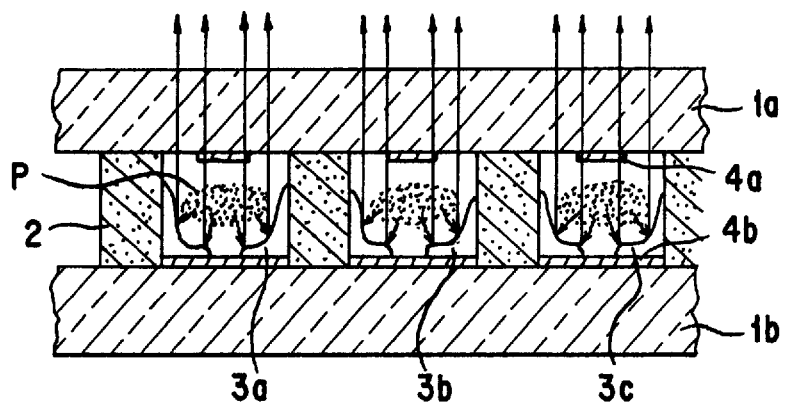
FIG. 1 is a fragmentary cross sectional view schematically illustrating the construction of a conventional DC type color PDP.
Figure 2:
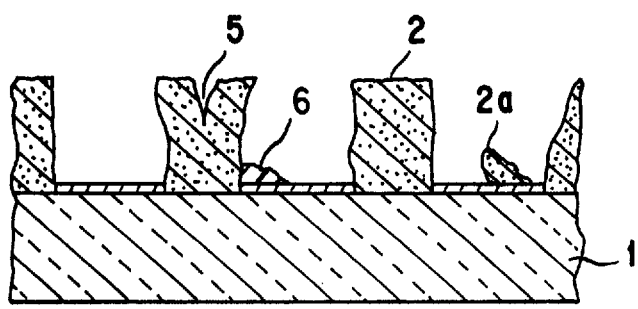
FIG. 2 is a fragmentary cross sectional view illustrating an example of a defect in barrier ribs of the conventional PDP.
Figure 3A:
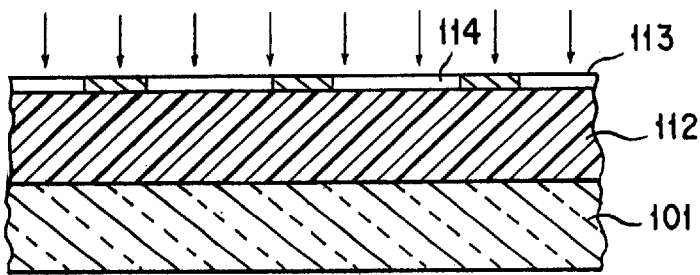
FIG. 3 (A) through FIG. 3 (F) are cross sectional views for explaining processes of one example of a method for the formation of the PDP barrier ribs according to the present invention.
Figure 3B:
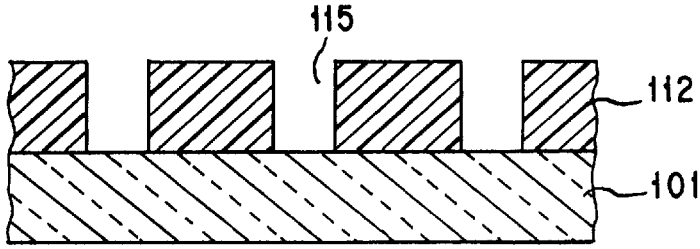
Figure 3C:
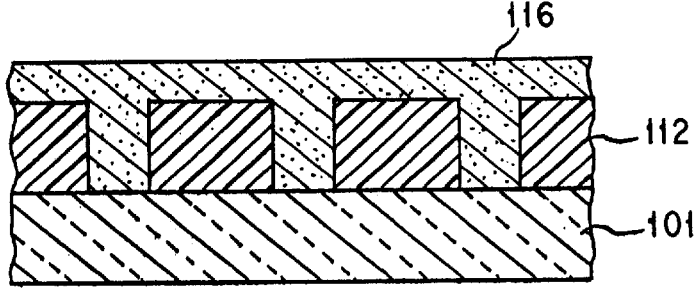
Figure 3D:
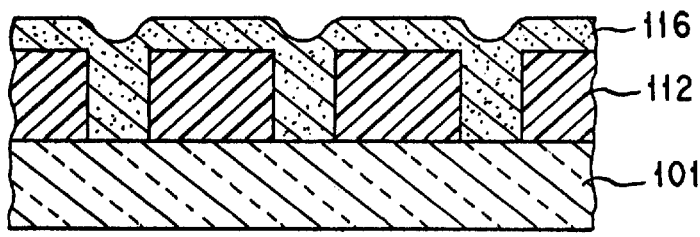
Figure 3E:
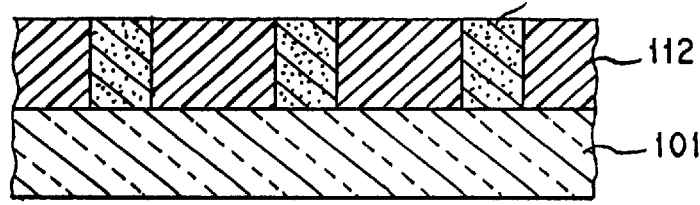
Figure 3F:
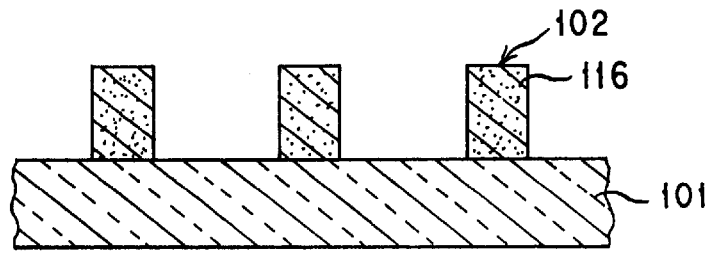

The present invention relates to a method for the formation of the PDP barrier ribs by forming grooves of a prescribed pattern in a film superposed on a substrate, applying a composition for the formation of barrier ribs to the film so as to fill the grooves, drying and thermally curing the composition, separating the film from the substrate by means of a remover, and subsequently calcining the hardened composition. The present inventors have found that the composition mentioned above, when used in forming the PDP barrier ribs according to the aforementioned method, permits smooth separation of the photosensitive film without entailing peeling of hardened barrier ribs during the separation of the photosensitive film from the substrate by means of the remover, allows the barrier ribs subsequently to the calcining to take shape with a fine pitch aimed at, and ensures production of barrier ribs of high accuracy and excellent quality without sustaining any noticeable breakage (occurrence of cracks and chippings) so far as the construction of individual barrier ribs is concerned.

The composition of the first aspect of the present invention for the formation of barrier ribs is characterized by containing, as a binder for glass powder and as a reinforcing agent, (B) a hydroxyl group-containing polymer possessing at least two hydroxyl groups per molecule and (E) the so-called silane coupling agent, i.e. an organosilicic compound possessing in one terminal part thereof an alkoxysilane group having at least two alkoxy groups bonded thereto and in the other terminal part thereof an amine terminal group. The composition of the second aspect of the present invention is characterized by further containing, as a crosslinking agent for the hydroxyl group-containing polymer (B) mentioned above, (F) a blocked isocyanate compound having isocyanate groups blocked with an amine in addition to satisfying the characteristic feature mentioned above.

Now, the actions or functions of the components of these compositions will be described in detail below.

It is considered that the hydroxyl group of the hydroxyl group-containing polymer (B) and the alkoxysilane group of the silane coupling agent (E) are caused to condense and form a film by the dealcoholization reaction caused during the course of thermal curing and that the silane coupling agent (E) is coupled also with the low-melting glass (A) and the inorganic filler (C) and is further caused to induce a condensation reaction with the hydroxyl group of the glass substrate. Further in the second composition, the isocyanate formed by the thermal dissociation of the blocked isocyanate compound (F) during the course of thermal curing reacts with the hydroxyl group of the hydroxyl group-containing polymer (B) to induce crosslinkage of the hydroxyl group-containing polymers. Since the hydroxyl groups, which are hydrophilic group, of the binder resin are nearly wholly collapsed as a result, the barrier ribs to be ultimately formed absorb water only sparingly during the separation of the photosensitive film by the use of a remover such as an aqueous alkali solution and exhibit fully satisfactory strength enough to withstand the impact of the separation of the photosensitive film. This effect can be enhanced by causing the composition to incorporate therein (G) a modified silicone oil possessing at least four alkoxysilane groups or silanol groups per molecule in addition to the aforementioned components of (A) through (F). Specifically, it is considered that the alkoxysilane groups or silanol groups of the modified silicone oil are caused to condense with the hydroxyl group of the hydroxyl group-containing polymer (B) and/or the alkoxysilane group of the silane coupling agent by the dealcoholization reaction and/or dehydration reaction during the course of thermal curing and contribute to formation of a film and that these groups are caused to induce coupling with the low-melting glass (A) and with the inorganic filler (C) and further a reaction of condensation with the hydroxyl group of the glass substrate. As a result, the glass paste acquires enhanced strength on hardening and exhibits enhanced adhesiveness to the glass substrate and the barrier ribs in a hardened state offer ample resistance to the pressure exerted by the photosensitive film when it is swelled during the course of separation and do not suffer displacement due to the pressure.

Then, the silane coupling agent (E) to be used in the present invention possesses in one terminal part thereof an alkoxysilane group having at least two alkoxy groups bonded thereto and in the other terminal part thereof an amine terminal group. The photosensitive film to be used during the formation of barrier ribs contains many carboxyl groups in the resin component thereof so as to allow development with an aqueous alkali solution such as an aqueous 1 to 5% $Na_2CO_3$ solution and permit separation with an alkali remover such as 3 to 5% NaOH. If the glass paste is formulated as a thermosetting system using an epoxy resin as a binder, for example, the photosensitive film and the glass paste will be bonded so strongly by the reaction of the carboxyl group with the epoxy group that the photosensitive film will no longer be separated or, when forcibly separated, the hardened glass paste will be separated at the same time. If other resin such as resol or methylol melamine is used for the aforementioned condensation and curing, a carbon residue will occur after the glass paste is calcined and will blacken the paste.

In contrast, the glass paste composition of the present invention does not entail the problem mentioned above because it uses a hydroxyl group-containing polymer and a silane coupling agent which excel in resistance to heat. The photosensitive film is rendered easily separable because the silane coupling agent possesses an amine terminal group in the other terminal part and, as a result, this amine terminal group forms a salt linkage or a weak hydrogen bonding with the carboxyl group of the photosensitive film held in contact with the glass paste.

Now, the blocked isocyanate compound (F) to be used in the resent invention will be described below by citing tolylene diisocyante as an example. As indicated by the following reaction formula (R-1), the tolylene diisocyanate has isocyanate groups blocked with an amine. When the tolylene diisocyanate is heated to a temperature in the approximate range of 150° to 160° C. during the course of thermal curing, it is dissociated into isocyanate and amine gas.

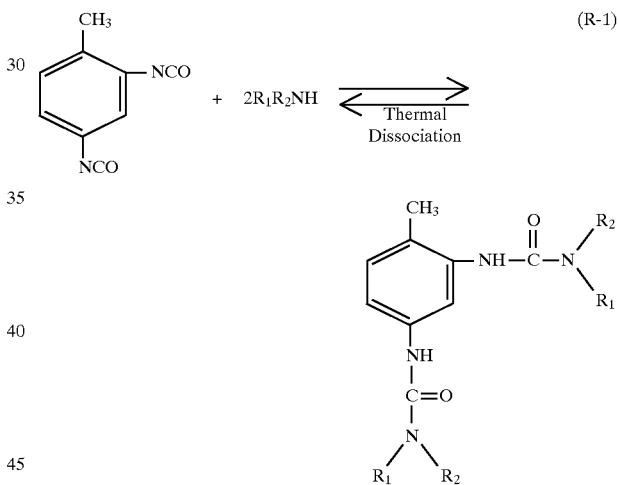

(R-1)

The isocyanate generated by the thermal dissociation reacts with the hydroxyl group of the hydroxyl group-containing polymer (B) and forms a crosslinkage therewith as described above and exalts the toughness of the barrier ribs to be formed. The amine gas meanwhile penetrates into the photosensitive film held in contact with the formed barrier ribs and, by reacting with and masking the carboxyl group in the photosensitive film, effectively inhibits the reaction of this carboxyl group with the other components forming the barrier ribs and safeguards the separability of the photosensitive film.

The composition of the present invention for the formation of barrier ribs, on being thermally cured, forms barrier ribs which possesses fully satisfactory strength and absorbs water only sparingly during the separation of the photosensitive film by the use of a remover such as an aqueous alkali solution because it contains, as a binder for glass powder and a reinforcing agent, (B) a hydroxyl group-containing polymer possessing at least two hydroxyl groups per molecule and (E) a silane coupling agent possessing in one terminal part thereof an alkoxysilane group having at least two alkoxy groups bonded thereto and in the other terminal part thereof an amine terminal group and/or (F) a blocked isocyanate compound having isocyanate groups blocked with an amine and further (G) a modified silicone oil possessing at least four alkoxysilane groups or silanol groups per molecule. Moreover, since the silane coupling agent to be used in the present invention possesses an amine terminal group in the other terminal part thereof, this amine terminal group forms a salt linkage or a weak hydrogen bonding with the carboxyl group of the photosensitive film held in contact with the glass paste. As for the carboxyl group of the photosensitive film which does not take part in the formation of this salt linkage, the fact that this carboxyl group is blocked by the amine gas generated in consequence of the thermal dissociation of the blocked isocyanate compound during the course of thermal curing renders the photosensitive film easily separable. As a result, the barrier ribs to be ultimately obtained manifests high accuracy and enjoys excellent quality because the hardened barrier ribs are not separated but the photosensitive film alone is smoothly separated during the separation of the photosensitive film and the barrier ribs subsequently to calcining take shape with a fine pitch.

By using as a diluent an organic solvent which is incapable of dissolving the photosensitive film and capable of dissolving the hydroxyl group-containing polymer, preferably a high-boiling petroleum solvent having a boiling point of not less than 150° C., the aforementioned glass paste composition on being applied to the photosensitive film so as to fill the grooves formed therein is allowed to form a film with high dimensional stability and afford stable workability without either swelling or dissolving the photosensitive film.

Now, the components of the composition of the present invention for the formation of the PDP barrier ribs will be described below.

As the glass component (A) mentioned above, a low-melting glass having a working point (the temperature at which the glass assumes viscosity of $10^4$ poises) of not more than 560° C. is advantageously used. The reason for this working point is that when glass having a higher working point is used, it manifests inferior adhesiveness because the barrier ribs are calcined at the last stage in the process for the formation of the PDP barrier ribs and the temperature for this calcining is generally set in the range of 550° to 560° C. in consideration of the deformation of the substratal glass by softening. It is not proper to use glass having an unduly low working point. This is because, if the working point of glass to be used is unduly lower than the calcining temperature, the glass component in the barrier ribs is suffered to flow readily and, as a result, widens the lower parts of barrier ribs and narrows the spaces between the adjacent barrier ribs and decreases the height of the barrier ribs and renders it difficult to obtain a desired aspect ratio with high accuracy. In view of the point mentioned above, the glass component is preferably a low-melting crystallized glass having a working point in the range of 300° to 560° C. and a high lead oxide content. As concrete examples of the glass component answering the description, the products of Iwaki Glass Co., Ltd. marketed under product codes of IWF Flit 7570, 7575, 7578, 7583, 7590, T015, T029, T077, T187, T191, T214, T436, CT410, CT-480D, and DT430 and the products of Corning Japan K.K. marketed under product codes of 1416, 1417, 7570, 7572, 7575, 7578, 7581, 7583, 7586, 7589, 7590, 7592, 7594, 7595, 7599, 7723, 7732, 8161, and 8407 may be cited. These products may be properly used either singly or in the form of a mixture of two or more members.

As examples of (B) the hydroxyl group-containing polymer possessing at least two hydroxyl groups per molecule, olefinic hydroxyl group-containing polymers, acrylic polyols, rubbery polyols, polyvinyl acetals, styrene-allyl alcohol resins, and phenolic resins are cited.

The olefinic hydroxyl group-containing polymers which are usable herein include such resins as have polyethylene, polypropylene, polybutadiene, etc. as a main chain and have at least two hydroxyl groups bonded to either a main chain or a side chain thereof and copolymers of allyl alcohol with ethylene or butadiene. In terms of the resistance to heat, olefinic hydroxyl group-containing polymers prove particularly advantageous.

As concrete examples of the acrylic polyols, the products of Mitsubishi Rayon Company Limited marketed under product codes of LR989, LR2507, LR2516, LR257, LR2536, LR532, LR598, LR566, LR286, LR511, and LR2528 may be cited. As concrete examples of the rubbery polyols, the product of Mitsui Petrochemical Industries, Ltd. marketed under trademark designation of Unistol P901 and the products of Kuraray Co., Ltd. marketed under trademark designations of Kuraprene LIR506, TL-20, TH-1, TH-21, and TH-31, Kurapol P-510, Kurapol P-1510, and Kurapol P-5010 may be cited. And, as concrete examples of the styrene-allyl alcohol resins, the products of Monsanto K.K. marketed under product codes of RJ100 and RJ101, and the products of Arco Chemical K.K. marketed under product codes of SAA100 and SAA101 may be cited.

The polyvinyl acetals which are usable herein include polyvinyl butyral, polyvinyl acetacetal, and polyvinyl formal, for example. They are generally produced by the acetalization of polyvinyl alcohols (PVA). They contain unaltered hydroxyl groups at a fairly large ratio because PVA's cannot be acetalized completely. They also contain unaltered acetyl groups at a small ratio at the end of saponification (in the process of PVA production). As concrete examples of the polyvinyl acetals, the products of Sekisui Chemical Co., Ltd. marketed under trademark designations of Eslex BLS, Eslex BMS, Eslex BHS, Eslex BLSH, and Eslex BMSH may be cited.

The phenolic resins are appropriately in the novolak type. As a concrete example of the phenolic resins, the product of Gunei Kagaku K.K. marketed under a product code of PS-2603 may be cited.

The hydroxyl group-containing polymer to be used herein should be soluble in the diluent (solvent) which avoids solving the photosensitive film. It should also exhibit fluidity enough to fill thoroughly the grooves of a narrow pitch formed in the photosensitive film having a thickness of not less than 100 μm and possess at a prescribed ratio a functional group (hydroxyl group) capable of reacting with the cross-linking agent.

Such hydroxyl group-containing polymers as are cited above can be infallibly used in filling grooves generally having a width of about 100 μm. They may incur difficulty, however, in filling the grooves which have a width of not more than about 50 μm, for example. In this case, it is proper to use a hydroxyl group-containing polymer exhibiting excellent flow properties and possessing a side chain as indicated by the following general formula (1).

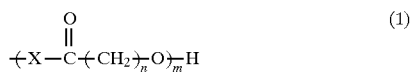

wherein X represents —O— or —NH—, n is an integer of 3 to 7, and m is an integer of 1 to 20.

By the incorporation of such a side chain as shown above, the hydroxyl group-containing polymer is enabled to exhibit a lowered glass transition point (Tg) and improved flowability and acquire both reactivity (primary hydroxyl group) and solubility in the diluent (solvent). The glass paste composition which contains such a hydroxyl group-containing polymer as mentioned above can be ideally applied to fill the extremely narrow grooves formed in a prescribed pattern in the photosensitive film which is superposed on the substrate to give rise with high accuracy to barrier ribs having a small wall thickness, a large aspect ratio, and high strength. In order for this effect to be fully manifested, the hydroxyl group-containing polymer mentioned above is desired to have a glass transition point (Tg) of not more than 30° C.

The hydroxyl group-containing polymers possessing a side chain represented by the general formula (1) mentioned above may be lactone-modified polymers obtained by adding a lactone represented by the following general formula (2) to the hydroxyl groups of olefinic hydroxyl group-containing polymers, acrylic polyols, rubbery polyols, polyvinyl acetals, styrene-allyl alcohol resins, and phenolic resins or to the amino groups of amino resins; homopolymers of lactone-modified monomers obtained by adding a lactone represented by the following general formula (2) to the hydroxyl group or amino group of a monomer possessing a hydroxyl group or an amino group and an unsaturated group in the molecule; or copolymers of the lactone-modified monomers mentioned above with monomers possessing other unsaturated group.

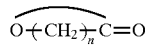   (2)

wherein n is an integer of 3 to 7.

The monomers which possess both a hydroxyl group and an unsaturated group in the molecule as described above include such hydroxyl group-containing monomers as 2-hydroxy-3-phenoxypropyl acrylate, 2-hydroxyethyl acrylate, 2-hydroxypropyl acrylate, 2-hydroxybutyl acrylate, 2-acryloyloxyethyl-2-hydroxyethyl phthalic acid, 2-acryloyloxyethyl-2-hydroxypropyl phthalic acid, 2-hydroxyethyl methacrylate, 2-hydroxypropyl methacrylate, 2-hydroxybutyl methacrylate, allyl alcohol, glycerin monoallyl ether, ethylene glycol monoallyl ether, and diethylene glycol monoallyl ether, for example. The monomers which possess both an amino group and an unsaturated group in the molecule include aminomethyl acrylate and 2-aminoethyl acrylate, for example. These monomers may be properly used either singly or in the form of a mixture of two or more members.

As the monomer to be copolymerized with the lactonemodified monomers obtained by adding a lactone of the general formula (2) to the hydroxyl group or amino group of the monomers mentioned above, various well-known vinyl compounds as various acrylates and methacrylates including the hydroxyl group-containing monomers mentioned above, styrene, and allyl compounds can be used.

The homopolymers of the lactone-modified monomers mentioned above and the copolymers thereof with other vinyl monomers can be easily obtained by solution polymerization using an initiator such as an azo compound like azobis isobutyronitrile or an organic peroxide.

In the lactones of the general formula (2) mentioned above which are used for the modification of the polymers or monomers mentioned above, those having an integer of 3 to 7, preferably 4 to 6, for n in the general formula (2) are particularly appropriate. If n exceeds 7, the relevant lactone permits no easy ring cleavage and incurs difficulty in effecting the modification of a polymer or monomer.

In the case of the lactone-modified polymer, the amount of the lactone added thereto is desired to be in the range of 0.1 to 3 times, preferably 0.5 to 1.5 times, the molecular weight of the polymer prior to the modification.

When the lactone is added to the hydroxyl group or amino group of the polymer, the lactone-modified polymer to be formed consequently is enabled to acquire an appreciably increased molecular weight because other lactones are added one by one to the consequently formed terminal hydroxyl group as shown in the following reaction formula (R-2) and this addition reaction sequentially proceeds.

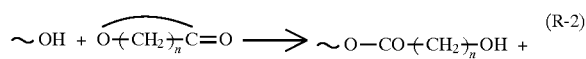

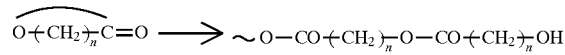

If the total amount of lactones so added exceeds three times the molecular weight of the polymer prior to the modification, however, the barrier ribs which are formed with the glass paste composition containing the relevant lactonemodified polymer will be at a disadvantage in acquiring unduly low strength and tending to sustain breakage (occurrence of defects, etc.) during the separation of the photosensitive film from a substrate with an alkali solution.

The same remark holds good for the lactone modification to be performed on the monomer. This modification is desired to be carried out to an extent such that a proportion in the range of 1/10 to 3/4, preferably 1/3 to 1/2, of the molecular weight of the ultimately produced polymer is accounted for by the amount of lactones added.

The hydroxyl group-containing polymer (B) to be used in the present invention is desired to have a molecular weight in the range of 2,000 to 50,000, irrespectively of the presence or absence of the side chain represented by the general formula (1) mentioned above. If the molecular weight is smaller than 2,000, the polymer will tend to dissolve the photosensitive film and swell this film. Conversely, if the molecular weight exceeds 50,000, the polymer will suffer degradation of the solubility thereof in the solvent and the glass paste composition containing this hydroxyl group-containing polymer will encounter difficulty in acquiring such fluidity as is required for the composition to fill the very narrow grooves formed in the photosensitive film. If the composition uses a solvent in an increased amount for the purpose of acquiring the fluidity, the proportion of the solvent in the composition, which is vaporized when the glass paste composition is applied to fill the grooves of the photosensitive film and then dried, will be increased and the degree with which the composition sinks after it is dried will be proportionately increased possibly to the extent of increasing the number of applications and degrading the workability. For the reasons adduced above, the hydroxyl group-containing polymer to be used in the present invention is desired to have a molecular weight in the range mentioned above.

When the grooves to be filled with the glass paste have an ordinary width of about 100 μm, however, the molecular weight of the hydroxyl group-containing polymer is not always limited below 50,000. A hydroxy group-containing polymer having a molecular weight up to about 60,000, for example, can be used. It goes without saying nevertheless that the hydroxyl group-containing polymer properly has a molecular weight in the range of 2,000 to 50,000 for the reasons mentioned above.

Further, the hydroxyl group-containing polymer (B) to be used in the present invention is desired to have a hydroxyl number or OH value in the approximate range of 10 to 100 mg KOH/g from the viewpoint of the condensation reaction thereof with the silane coupling agent or the modified silicone oil described above in connection with the function mentioned above.

The amount of the hydroxyl group-containing polymer to be incorporated in the composition is desired to be in the range of 2 to 30 parts, preferably 10 to 15 parts, by weight based on 100 parts by weight of the low-melting glass mentioned above. If the amount of the hydroxyl group-containing polymer to be incorporated is less than 2 parts by weight, the polymer will be at a disadvantage in insufficiently discharging the function thereof as a binder with the silane coupling agent and suffering degradation of the ability to endure the impact of separation of the film. If this amount conversely exceeds 30 parts by weight, the polymer will be at a disadvantage in disposing the barrier ribs to sustain cracks during the course of thermal curing.

As the inorganic filler (C) mentioned above, all the inorganic fillers including alumina (aluminum oxide) and titanium dioxide which are incapable of coloring the barrier ribs to be formed can be used. It should be noted, however, that when titanium dioxide is used, the barrier ribs acquire a slightly yellowish tint. In contrast, when alumina is used as a filler, the barrier ribs have a white color. Since the PDP barrier ribs are required to possess high reflectance, alumina proves most suitable.

The glass component shrinks during the course of calcining. By the incorporation of the inorganic filler, this shrinkage can be notably precluded. In order for the inorganic filler to manifest this effect, the amount of the inorganic filler to be incorporated in the composition is desired to be in the range of 5 to 300 parts, preferably 10 to 100 parts, by weight based on 100 parts by weight of the low-melting glass mentioned above.

As for the diluent (D) mentioned above, it is necessary that the diluent be incapable of either dissolving or swelling the photosensitive film which has been photocured in addition to being capable of dissolving the hydroxyl group-containing polymer. When a glass paste composition which uses an ether type, alcohol type, or acetate type solvent as a diluent is applied to the photosensitive film, the film in contact with the composition swells and exerts pressure on the barrier ribs. As a result, the PDP barrier ribs can not be formed with high accuracy. When the barrier ribs are formed with the glass paste composition of the present invention, this glass paste composition is defoamed during the course of drying as described hereinbelow after it has filled the grooves in the photosensitive film. During the course of this defoaming, it is necessary that the diluent be gradually vaporized. Therefore, the preferable diluent is a high-boiling petroleum solvent having a boiling point of not less than 150° C. A low-boiling solvent may be used instead. In this case, however, the temperature of drying should be lowered proportionately.

In the present invention, therefore, a high-boiling petroleum solvent which is incapable of either dissolving or swelling the photosensitive film which has been photocured and, at the same time, capable of dissolving the binder resin is advantageously used. The high-boiling petroleum solvents which answer the description include such aromatic solvents as the products of Exxon Chemicals K.K. marketed under trademark designations of Solvesso #100, Solvesso #150, Solvesso #200, and Exxon Aromatic Naphtha No. 2 and the products of Shell Chemicals K.K. marketed under product codes of LAWS, HAWS, VLAWS, Shelsol® D40, D60, D70, 71, 70, 100, A, AB, DOSB, and DOSB-B and such aliphatic solvents as the products of Exxon Chemicals K.K. marketed under trademark designations of Exxon Naphtha No. 5, No. 6, No. 7, Exxon Odorless Solvent, and Exxon Rubber Solvent, for example. Besides, tetralin (tetrahydronaphthalene), decalin (decahydronaphthalene), biphenyl, turpentine, pinene, pine oil, and camphor oil can be used.

These diluents may be used either singly or in the form of a mixture of two or more members.

The amount of the diluent to be incorporated in the composition is desired to be in the range of 20 to 50 parts by weight, based on 100 parts by weight of the low-melting glass mentioned above.

Low-boiling petroleum solvents, acetate type solvents, ether type solvents, and alcoholic solvents can be used at a ratio within 20% of the diluent (D) mentioned above on the condition that they should neither dissolve nor swell the photosensitive film which has been photocured.

Then, the silane coupling agent (E) mentioned above is used for linkage with the hydroxyl group-containing polymer and inorganic filler, which are contained in the glass paste composition as mentioned above, and with the glass substrate. Particularly when the silane coupling agent is strongly bonded to the glass substrate, the barrier ribs acquire such high adhesiveness to the substrate that they are not displaced or separated at the time that the photosensitive film is separated. The silane coupling agent, however, should be bound mildly with the photosensitive film. For this reason, a silane coupling agent which possesses in one terminal part thereof an alkoxysilane group having at least two alkoxy groups bonded thereto and in the other terminal part thereof an amine terminal group is used. The alkoxy groups which are usable in the silane coupling agent include methoxy group, ethoxy group, propoxy group, and butoxy group. The alkoxy groups higher than propoxy group are not preferred because they contribute to retard the reaction. The methoxy group proves most appropriate. The amine terminal groups which are preferable are amino group and urea group. The silane coupling agents which answer this description include γ-ureidopropyl triethoxy silane, γ-aminopropyl triethoxy silane, and N-β(aminoethyl)-γ-aminopropyl triethoxy silane, for example. These silane coupling agents may be used either singly or in the form of two or more members.

The amount of the silane coupling agent to be incorporated in the composition is desired to be in the range of 0.5 to 5 parts by weight based on 100 parts by weight of the low-melting glass mentioned above. If this amount is less than 0.5 part by weight, the barrier ribs to be formed will be at a disadvantage in acquiring unduly low strength. Conversely, if this amount exceeds 5 parts by weight, the formed barrier ribs will be at a disadvantage in being unduly soft.

The blocked isocyanate compound (F) mentioned above is usable so long as it has isocyanate groups so blocked with an amine and is decomposed into an isocyanate and an amine gas when it is heated to a temperature in the approximate range of 150 to 160° C. during the course of thermal curing. The isocyanate which is adapted for the blocked isocyanate compound ought to possess at least two isocyanate groups per molecule. As concrete examples of the isocyanates answering the description, 2,4-tolylene diisocyanate (abbreviated as "2,4-TDI"; which form of contraction invariably applies hereinbelow), 2,6-tolylene diisocyanate (2,6-TDI), 1,5-naphthalene diisocyanate (1,5-NDI), hexamethylene diisocyanate (HMDI), isophorone diisocyanate (IPDI), tolidine diisocyanate (TODI), xylylene diisocyanate (XDI), m-tetramethyl xylene diisocyanate (m-TMXDI), p-tetramethyl xylene diisocyanate (P-TMXDI), triphenyl methane triisocyanate, and lysine diisocyanate (LDI) may be cited. As concrete examples of the amines which blocks the isocyanate group, dimethyl amine, diethyl amine, dipropyl amine, di-i-propyl amine, dibutyl amine, di-t-butyl amine, and diethanol amine may be cited.

The blocked isocyanate compounds which are obtained by causing various isocyanates cited above to react with an amine until thorough distinction of free isocyanate groups may be used either singly or in the form of a mixture of two or more members. The blocked isocyanate compound is thermally dissociated into an amine and an isocyanate on being heated as described above. The isocyanate reacts with the hydroxyl group-containing polymers and forms a crosslinkage therebetween.

The amount of the blocked isocyanate compound of this nature to be incorporated in the composition is desired to be in the range of 0.1 to 20 parts by weight based on 100 parts by weight of the low-melting glass mentioned above. If this amount is less than 0.1 part by weight, the amount of the isocyanate which is generated after the thermal dissociation will not be sufficient for the sake of cross-linking the hydroxyl group-containing polymers mentioned above. If this amount conversely exceeds 20 parts by weight, the portion of the blocked isocyanate compound which does not contribute to the crosslinkage of the hydroxyl group-containing polymers will unduly increase.

The modified silicone oil (G) mentioned above which possesses at least four alkoxysilane groups or silanol groups per molecule is a silicone oil having both terminals or side chains thereof modified with alkoxysilane groups or silanol groups. As concrete examples of the modified silicone oils, the products of Nippon Unicar Co., Ltd. marketed under product codes of FZ-3701, FZ-3704, FZ-3122, and L-9000 may be cited.

The amount of the modified silicone oil to be incorporated is sufficiently in the range of 0.1 to 3 parts by weight based on 100 parts by weight of the low-melting glass mentioned above. If this amount exceeds 5 parts by weight, the barrier ribs to be ultimately formed will be at a disadvantage in being unduly soft.

Now, an example of the method adopted for the formation of the PDP barrier ribs as contemplated by the present invention will be described below with reference to FIGS. 3 (A) through 3 (F). The present invention is aimed at forming the PDP barrier ribs. Since electrodes and other components in the PDP can be formed by the conventional method, they will be omitted from the following description. It is natural that the method of the present invention for the formation of the PDP barrier ribs be applicable to both the DC type PDP and the AC type PDP.

First, a photosensitive film 112 is superposed on a transparent substrate 101 and grooves 115 of a prescribed pattern are formed in the film 112 by a photo-process or photoengraving process, as shown in FIGS. 3 (A) and (B). This formation of the grooves is implemented in the same manner as heretofore practiced. To be specific, the photosensitive film 112 is attached fast to the surface of the transparent substrate 101 such as a glass sheet and then a photomask 113 containing pattern holes 114 as prescribed is superposed on the film 112 as shown in FIG. 3 (A) and thereafter the film is subjected to exposure to light. Then, the areas of the photosensitive film which has not been exposed to light through the photomask 113 is removed by development as shown in FIG. 3 (B). When a transparent substrate having electrodes of a prescribed pattern formed in advance on the surface thereof is used, it is superposed on the photosensitive film in such a manner that the pattern holes in the photomask are aligned with the positions of the electrodes.

Then, a glass paste 116 of the present invention which has the composition mentioned above is applied in such a manner to the patterned photosensitive film 112 which has been formed in consequence of the exposure to light and development mentioned above that the glass paste fills the grooves 115 of the pattern as shown in FIG. 3 (C). The applied glass plate is defoamed, preferably under a reduced pressure, and then dried. By this operation, the glass paste part is defoamed and caused to sink as shown in FIG. 3 (D). When necessary, the cycle of applying-defoaming-drying of the glass paste may be repeated several times. In this operation, the drying operation is desired to be carried out slowly lest the solvent in the glass paste composition, on being volatilized, should leave residual bubbles behind in the composition. The drying operation is properly carried out at a temperature of about 80° C. for 30 minutes to ensure perfect removal of bubbles. After the drying operation, the glass paste is thermally cured at a temperature in the approximate range of 150° to 160° C. for a period in the range of 30 to 60 minutes. After the hot glass paste is cooled, the surface of the hardened glass paste is polished until the photosensitive film 112 appears [Fig. 3 (E)].

The procedure of immersing the resultant substrate 101 in the solution of a remover such as, for example, an aqueous alkali solution, specifically an aqueous 3 to 5% NaOH solution is repeated plural times until the photosensitive film 112 is swelled and separated from the substrate.

The substrate 101 from which the photosensitive film 112 has been separated as shown in FIG. 3 (F) is cleansed, dried, and then heated to a temperature in the approximate range of 550° to 560° C. to calcine the hardened glass paste.

By this process, highly accurate PDP barrier ribs 102 having a uniform width in the approximate range of 30 to 100 μm and a uniform height in the approximate range of 100 to 200 μm are formed on the substrate 101.

As the material for the film which is superposed on the substrate and in which the grooves are formed in a prescribed pattern, a liquid developable photosensitive resist can be used besides the photosensitive film (dry film).

The material for the film mentioned above is ideally used when it is of such a type as to be easily peeled off with an aqueous alkali solution even after it has undergone the step of hardening the composition for the formation of barrier ribs.

Since the composition of the present invention for the formation of barrier ribs excels in flowability, it can be made with high workability to fill the extremely narrow grooves in the prescribed pattern formed in the photosensitive film. Since it also excels in thermal curability and avoids forming a strong bond with the photosensitive film, the hardened barrier ribs are not separated and only the photosensitive film is smoothly separated when the photosensitive film is separated from the substrate with a remover in the process for the formation of the PDP barrier ribs and the barrier ribs subsequently to the calcining are allowed to take shape at a desired fine pitch without sustaining defects such as cracks and chippings or saggings due to fusion. Thus, the produced barrier ribs possess a fully satisfactory aspect ratio, exhibits high accuracy and high strength, and enjoys excellent quality. Further, the barrier ribs of such high accuracy can be formed with high workability.

Now, the present invention will be described more specifically below with reference to working examples.

EXAMPLE 1

Preparation of paste for PDP barrier ribs

A main agent of the paste for PDP barrier ribs was prepared by joining and thoroughly stirring the following components and kneading the resultant blend three times by the use of a three-roll mill made of a ceramic substance.

| | |
|---|---|
| Low-melting glass (product of Iwaki Glass Co., Ltd. marketed under product code of "IWF7578W") | 100.0 parts by weight |
| Olefinic hydroxyl group-containing polymer (polypropylene type resin with Mw 50,000, hydroxyl number 50 mg KOH/g, solid content 25% in alkylbenzene solution, produced by Mitsui Petrochemical Industries, Ltd. and marketed under trademark designation of "Unistol P901") | 44.0 parts by weight |
| Alumina powder | 10.0 parts by weight |
| Total | 154.0 parts by weight |

A mixture of 35.0 g of this main agent with 0.26 g of a silane coupling agent (product of Nippon Unicar Co., Ltd. marketed under product code of "AZ6166") as a curing agent was adjusted to a viscosity of about 80 Ps. (measured with an E type viscometer at 25° C. at 5 rpm; the conditions invariably apply hereinafter) by the addition of a diluent (product of Mitsubishi Chemical Co., Ltd. marketed under trademark designation of "Alkyl Benzene #246").

Formation of PDP barrier ribs

Figure 4:
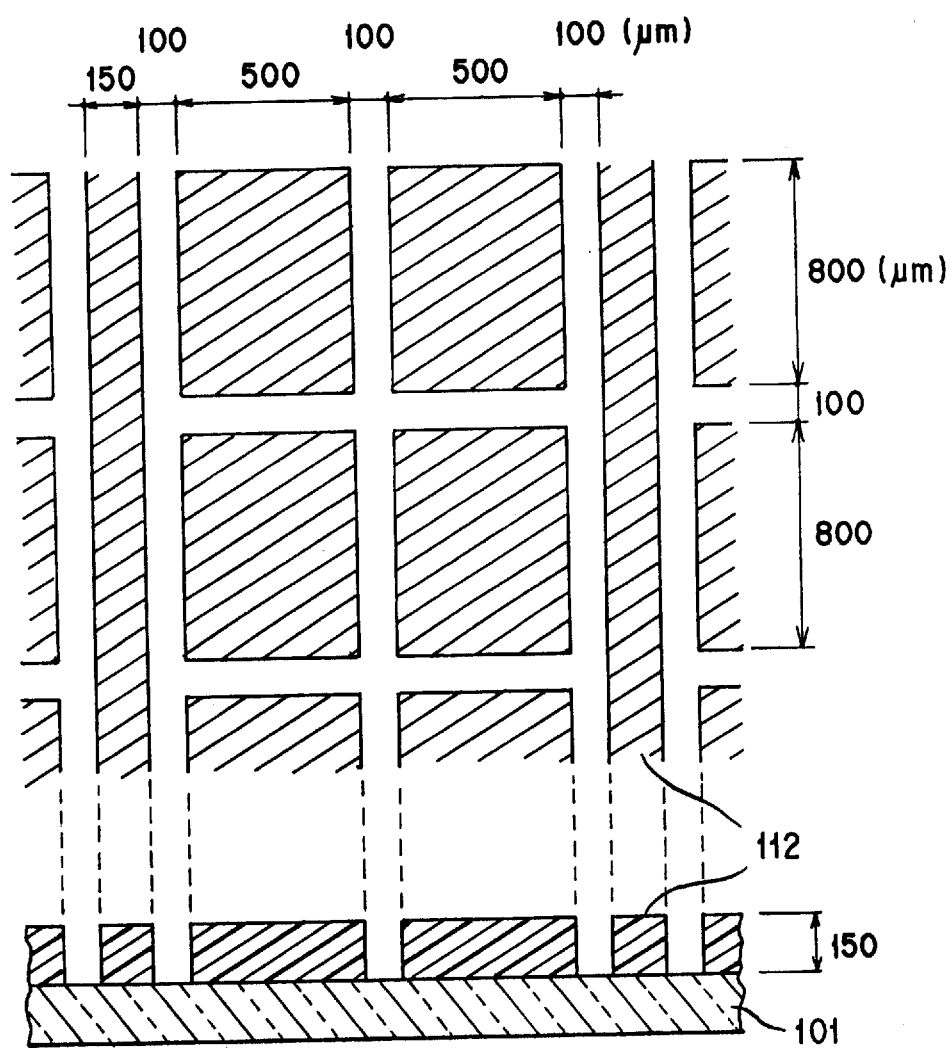
FIG. 4 is an explanatory diagram showing a pattern formed in photosensitive film for a sample sheet produced in Example 1.

A sample sheet was prepared by mounting a photosensitive film (dry film) 112 on a glass substrate 101 and forming a groove pattern in such dimensions as shown in FIG. 4 in the film.

The paste prepared as described above was applied to the sample sheet with a squeegee so as to fill up the grooves in the dry film of the sample sheet. The sample sheet coated with the paste was placed in a desiccator made of acrylic resin and, with the interior pressure of the desiccator reduced to below 200 mmHg, left standing for five minutes to be defoamed. It was subsequently dried in a box type hot-air drier at 80° C. for 45 minutes. Since the paste filled in the grooves sunk in proportion as the solvent was volatilized, the procedure (printing-defoaming-drying of the paste) was repeated three times. In the fourth procedure, the paste was again applied to the entire surface in a thickness of 300 to 500 μm.

Thereafter, the sample sheet was dried at 80° C. for 45 minutes and then thermally cured at 150° C. over a period of 30 minutes. After it was cooled, the surface of the hardened paste was polished until the dry film appeared. The sample sheet was kept immersed for five minutes in an aqueous 5% KOH solution, pulled out of the solution, and then immersed in water for five minutes. The sample sheet from which the dry film was separated was gently washed with water, dried, and calcined in an electric oven as enclosed with an ambience of air. The calcining was carried out by a procedure comprising the steps of raising the ambient temperature from room temperature to 350° C. at a temperature increasing rate of 3° C./minute, keeping it at 350° C. for 30 minutes, then raising it to 550° C. at a temperature increasing rate of 5° C./minute, keeping it at 550° C. for 30 minutes, and thereafter allowing it to fall to room temperature.

After the calcining was completed, highly accurate PDP barrier ribs having a uniform width of 100 μm and a uniform height of about 120 μm were obtained.

EXAMPLE 2

Preparation of paste for PDP barrier ribs

A main agent of the paste for PDP barrier ribs was prepared by joining and thoroughly stirring the following components and kneading the resultant blend three times by the use of a three-roll mill made of a ceramic substance.

| | |
|---|---|
| Low-melting glass (IWF7578W) | 100.0 parts by weight |
| Olefinic hydroxyl group-containing polymer (Unistol P901, solid content 25% in alkylbenzene solution) | 44.0 parts by weight |
| Blocked isocyanate compound (product of Sanapro K.K. marketed under product code of "UCAT3503N") | 4.0 parts by weight |
| Alumina powder | 25.0 parts by weight |
| Titanium dioxide powder | 25.0 parts by weight |
| Diluent (Alkyl Benzene #246) | 10.0 parts by weight |
| Total | 208.0 parts by weight |

A mixture of 35.0 g of this main agent with 0.26 g of a silane coupling agent (AZ6118) as a curing agent was adjusted to a viscosity of about 80 Ps. by the addition of a diluent (Alkyl Benzene #246).

Formation of PDP barrier ribs

A sample sheet was prepared by mounting a photosensitive film (dry film) 112 on a glass substrate 101 and forming a groove pattern in such dimensions as shown in FIG. 4 in the film.

The paste prepared as described above was applied to the sample sheet with a squeegee so as to fill up the grooves in the dry film of the sample sheet. The sample sheet coated with the paste was placed in a desiccator made of acrylic resin and, with the interior pressure of the desiccator reduced to below 200 mmHg, left standing for five minutes to be defoamed. It was subsequently dried in a box type hot-air drier at 80° C. for 45 minutes. Since the paste filled in the grooves sunk in proportion as the solvent was volatilized, the procedure (printing-defoaming-drying of the paste) was repeated twice. In the third procedure, the paste was again applied to the entire surface in a thickness of 100 to 200 μm.

Thereafter, the subsequent steps of drying, thermal curing, surface polishing, dry film separation, and calcining of the paste were performed in the same manner as in Example 1.

After the calcining was completed, highly accurate PDP barrier ribs having a uniform width of 100 μm and a uniform height of about 100 μm were obtained.

EXAMPLE 3

Preparation of paste for PDP barrier ribs

A main agent of the paste for PDP barrier ribs was prepared by joining and thoroughly stirring the following components and kneading the resultant blend three times by the use of a three-roll mill made of a ceramic substance.

| | |
|---|---|
| Low-melting glass (IWF7578W) | 100.0 parts by weight |
| Lactone-modified polyvinyl butyral (polyvinyl butyral (product of Sekisui Chemical Co., Ltd. marketed under product code of "BLSH") modified with ε-caprolactone, BLSH : ε-caprolactone = 50:50, hydroxyl number 35 mg KOH/g, solid content 50% in a diluent (product of Exxon K.K. marketed under trademark designation of "Solvesso #200)) | 60.0 parts by weight |
| Blocked isocyanate compound (UCAT3503N) | 4.0 parts by weight |
| Alumina powder | 25.0 parts by weight |
| Titanium dioxide powder | 25.0 parts by weight |
| Total | 214.0 parts by weight |

A mixture of 35.0 g of this main agent with 0.50 g of a silane coupling agent (AZ6118) as a curing agent was adjusted to a viscosity of about 80 Ps. by the addition of a diluent (Solvesso #200).

Formation of PDP barrier ribs

The steps of Example 2 were repeated using the paste prepared as described above. The highly accurate PDP barrier ribs having a uniform width of 100 μm and a uniform height of about 120 μm were obtained.

EXAMPLE 4

Preparation of paste for PDP barrier ribs

A main agent of the paste for PDP barrier ribs was prepared by joining and thoroughly stirring the following components and kneading the resultant blend three times by the use of a three-roll mill made of a ceramic substance.

| | |
|---|---|
| Low-melting glass (IWF7578W) | 100.0 parts by weight |
| Lactone-modified acrylic polyol (product of Daicel Chemical Ltd. marketed under trademark designation of "Placcel DC2016", hydroxyl number 81.7 mg KOH/g, solid content 70% in xylene) | 32.1 parts by weight |
| Blocked isocyanate compound (UCAT3503N) | 4.0 parts by weight |
| Alumina powder | 25.0 parts by weight |
| Titanium dioxide powder | 25.0 parts by weight |
| Diluent (Solvesso #200) | 20.0 parts by weight |
| Total | 206.1 parts by weight |

A mixture of 35.0 g of this main agent with 0.50 g of a silane coupling agent (AZ6118) as a curing agent was adjusted to a viscosity of about 80 Ps. by the addition of a diluent (Solvesso #200).

Formation of PDP barrier ribs

Figure 5:
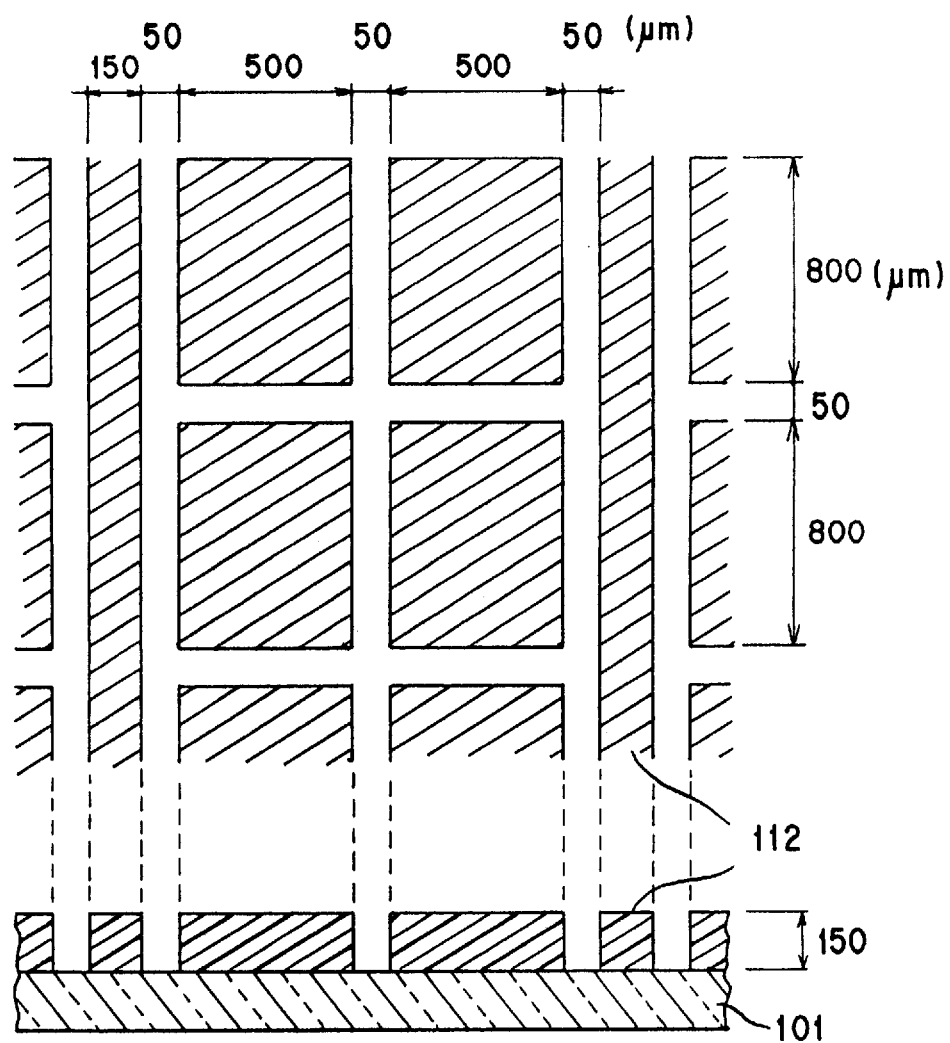
FIG. 5 is an explanatory diagram showing a pattern formed in a photosensitive film for a sample sheet produced in Example 4.

The paste prepared as described above was treated by following the procedures of Example 2 except that grooves were formed in a photosensitive film 112 in a pattern as shown in FIG. 5. The highly accurate PDP barrier ribs having a uniform width of 50 μm and a uniform height of about 120 μm were obtained.

EXAMPLE 5

Preparation of paste for PDP barrier ribs

A main agent of the paste for PDP barrier ribs was prepared by joining and thoroughly stirring the following components and kneading the resultant blend three times by the use of a three-roll mill made of a ceramic substance.

| | |
|---|---|
| Low-melting glass (IWF7578W) | 100.0 parts by weight |
| Lactone-modified acrylic polyol (product of Daicel Chemical Ltd. marketed under trademark designation of "Placcel DC2009", hydroxyl number 91.2 mg KOH/g, solid content 70% in xylene) | 32.1 parts by weight |
| Blocked isocyanate compound (UCAT3503N) | 4.0 parts by weight |
| Alumina powder | 25.0 parts by weight |
| Titanium dioxide powder | 25.0 parts by weight |
| Diluent (Solvesso #200) | 20.0 parts by weight |
| Total | 206.1 parts by weight |

A mixture of 35.0 g of this main agent with 0.50 g of a silane coupling agent (AZ6118) as a curing agent was adjusted to a viscosity of about 80 Ps. by the addition of a diluent (Solvesso #200).

Formation of PDP barrier ribs

The steps of Example 4 were repeated using the paste prepared as described above. The highly accurate PDP barrier ribs having a uniform width of 50 μm and a uniform height of about 120 μm were obtained.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A composition for the formation of barrier ribs of a plasma display panel, which comprises (A) a low-melting glass having a wording point of not more than 560 (C, (B) a hydroxyl group-containing polymer having at least two hydroxyl groups per molecule, (C) an inorganic filler, (D) a diluent, and (E) 0.5 to 5 parts by weight, based on 100 parts by weight of said low-melting glass (A), of a silane coupling agent possessing in one terminal part thereof an alkoxysilane group having at least two alkoxy groups bonded thereto and in the other terminal part thereof an amine terminal group.

2. The composition according to claim 1, which further comprises (G) a modified silicone oil having at least four alkoxysilane groups or silanol groups per molecule.

3. The composition according to claim 2, wherein said modified silicon oil (G) is present in an amount of 0.1 to 3 parts by weight based on 100 parts by weight of said low-melting glass (A).

4. The composition according to claim 1, wherein said low-melting glass (A) is a lead glass with a high lead oxide content having a working point of not more than 560° C.

5. The composition according to claim 1, wherein said hydroxyl group-containing polymer (B) is at least one polymer selected from the group consisting of olefinic hydroxyl group-containing polymers, acrylic polyols, rubbery polyols, polyvinyl acetals, styrene-allyl alcohol resins, and phenolic resins.

6. A composition according to claim 1, which comprises (A) a low-melting glass having a working point of not more than 560° C., (B) a hydroxyl group-containing polymer having at least two hydroxyl groups per molecule, and a side chain represented by the following general formula (1):

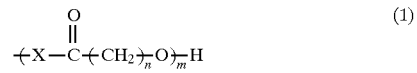

wherein X represents —O— or —NH—, n is an integer of 3 to 7, and m is an integer of 1 to 20, (C) an inorganic filler, (D) a diluent, and (E) an organosilicic compound possessing in one terminal part thereof an alkoxysilane group having at least two alkoxy groups bonded thereto and in the other terminal part thereof an amine terminal group.

7. The composition according to claim 6, wherein said hydroxyl group-containing polymer (B) is a lactone-modified polymer obtained by adding a lactone represented by the following general formula (2) to a hydroxyl group or amino group of at least one polymer selected from the group consisting of olefinic hydroxyl group-containing polymers, acrylic polyols, rubbery polyols, polyvinyl acetals, styrene-allyl alcohol resins, phenolic resins, and amino resins:

$$O\!-\!(CH_2)_{\overline{n}}\!-\!C\!=\!O \qquad (2)$$

wherein n is an integer of 3 to 7.

8. The composition according to claim 6, wherein said hydroxyl group-containing polymer (B) is a homopolymer of a lactone-modified monomer obtained by adding a lactone represented by the following general formula (2) to a hydroxyl group or amino group of a monomer possessing the hydroxyl group or amino group and an unsaturated group together in one molecule thereof:

$$O\!-\!(CH_2)_{\overline{n}}\!-\!C\!=\!O \qquad (2)$$

wherein n is an integer of 3 to 7.

9. The composition according to claim 6, wherein said hydroxyl group-containing polymer (B) is a copolymer of a lactone-modified monomer with a monomer possessing an unsaturated group, said lactone-modified monomer being obtained by adding a lactone represented by the following general formula (2) to a hydroxyl group or amino group of a monomer possessing the hydroxyl group or amino group and an unsaturated group together in one molecule thereof:

$$O\!-\!(CH_2)_{\overline{n}}\!-\!C\!=\!O \qquad (2)$$

wherein n is an integer of 3 to 7.

10. The composition according to claim 1, wherein said hydroxyl group-containing polymer (B) has a glass transition point (Tg) of not more than 30° C.

11. The composition according to claim 1, wherein said hydroxyl group-containing polymer (B) has a molecular weight in the range of 2,000 to 50,000.

12. The composition according to claim 1, wherein said hydroxyl group-containing polymer (B) has a hydroxyl number in the range of 10 to 100 mg KOH/g.

13. The composition according to claim 1, wherein said inorganic filler (C) is an aluminum oxide, titanium dioxide, or a mixture thereof.

14. The composition according to claim 1, wherein said diluent (D) is a high-boiling petroleum solvent having a boiling point of not less than 150° C.

15. The composition according to claim 1, wherein said silane coupling agent (E) is selected from the group consisting of γ-ureidopropyl triethoxy silane, γ-aminopropyl triethoxy silane, and N-β(aminoethyl)- γ-aminopropyl triethoxy silane.

16. The composition according to claim 1, wherein said composition contains 2 to 30 parts by weight of said hydroxyl group-containing polymer (B), 5 to 300 parts by weight of said inorganic filler (C), 20 to 50 parts by weight of said diluent (D), and 0.5 to 5 parts by weight of said silane coupling agent (E), respectively based on 100 parts by weight of said low-melting glass (A).

17. A composition for the formation of barrier ribs of a plasma display panel, which comprises (A) a low-melting glass having a working point of not more than 560° C., (B) a hydroxyl group-containing polymer having at least two hydroxyl groups per molecule, (C) an inorganic filler, (D) a diluent, (E) an organosilicic compound possessing in one terminal part thereof an alkoxysilane group having at least two alkoxy groups bonded thereto and in the other terminal part thereof an amine terminal group, and (F) a blocked isocyanate compound having isocyanate groups blocked with an amine.

18. The composition according to claim 17, which further comprises (G) a modified silicone oil having at least four alkoxysilane groups or silanol groups per molecule.

19. The composition according to claim 18, wherein said modified silicon oil (G) is present in an amount of 0.1 to 3 parts by weight based on 100 parts by weight of said low-melting glass (A).

20. The composition according to claim 17, wherein said low-melting glass (A) is a lead glass with a high lead oxide content having a working point of not more than 560° C.

21. The composition according to claim 17, wherein said hydroxyl group-containing polymer (B) is at least one polymer selected from the group consisting of olefinic hydroxyl group-containing polymers, acrylic polyols, rubbery polyols, polyvinyl acetals, styrene-allyl alcohol resins, and phenolic resins.

22. The composition according to claim 17, wherein said hydroxyl group-containing polymer (B) possesses a side chain represented by the following general formula (1):

$$\!-\!(X\!-\!\overset{O}{\overset{\|}{C}}\!-\!(CH_2)_{\overline{n}}\!-\!O)_{\overline{m}}\!-\!H \qquad (1)$$

wherein X represents —O— or —NH—, n is an integer of 3 to 7, and m is an integer of 1 to 20.

23. The composition according to claim 22, wherein said hydroxyl group-containing polymer (B) is a lactone-modified polymer obtained by adding a lactone represented by the following general formula (2) to a hydroxyl group or amino group of at least one polymer selected from the group consisting of olefinic hydroxyl group-containing polymers, acrylic polyols, rubbery polyols, polyvinyl acetals, styrene-allyl alcohol resins, phenolic resins, and amino resins:

$$O\!-\!(CH_2)_{\overline{n}}\!-\!C\!=\!O \qquad (2)$$

wherein n is an integer of 3 to 7.

24. The composition according to claim 22, wherein said hydroxyl group-containing polymer (B) is a homopolymer of a lactone-modified monomer obtained by adding a lactone represented by the following general formula (2) to a hydroxyl group or amino group of a monomer possessing the hydroxyl group or amino group and an unsaturated group together in one molecule thereof:

$$O\!-\!(CH_2)_{\overline{n}}\!-\!C\!=\!O \qquad (2)$$

wherein n is an integer of 3 to 7.

25. The composition according to claim 22, wherein said hydroxyl group-containing polymer (B) is a copolymer of a lactone-modified monomer with a monomer possessing an unsaturated group, said lactone-modified monomer being obtained by adding a lactone represented by the following general formula (2) to a hydroxyl group or amino group of a monomer possessing the hydroxyl group or amino group and an unsaturated group together in one molecule thereof:

$$O\!-\!(CH_2)_{\overline{n}}\!-\!C\!=\!O \qquad (2)$$

wherein n is an integer of 3 to 7.

26. The composition according to claim 17, wherein said hydroxyl group-containing polymer (B) has a glass transition point (Tg) of not more than 30° C.

27. The composition according to claim 17, wherein said hydroxyl group-containing polymer (B) has a molecular weight in the range of 2,000 to 50,000.

28. The composition according to claim 17, wherein said hydroxyl group-containing polymer (B) has a hydroxyl number in the range of 10 to 100 mg KOH/g.

29. The composition according to claim 17, wherein said inorganic filler (C) is an aluminum oxide, titanium dioxide, or a mixture thereof.

30. The composition according to claim 17, wherein said diluent (D) is a high-boiling petroleum solvent having a boiling point of not less than 150° C.

31. The composition according to claim 17, wherein said organosilicic compound (E) is selected from the group consisting of 65-ureidopropyl triethoxy silane, 65-aminopropyl triethoxy silane, and N-62(aminoethyl)-65-aminopropyl triethoxy silane.

32. The composition according to claim 17, wherein said blocked isocyanate compound is a di-isocyanate or tri-isocyanate whose isocyanate groups being blocked with an amine.

33. The composition according to claim 17, wherein said composition contains 2 to 30 parts by weight of said hydroxyl group-containing polymer (B), 5 to 300 parts by weight of said inorganic filler (C), 20 to 50 parts by weight of said diluent (D), 0.5 to 5 parts by weight of said organosilicic compound (E), and 0.1 to 20 parts by weight of said blocked isocyanate compound (F), respectively based on 100 parts by weight of said low-melting glass (A).

* * * * *